United States Patent [19]

Passagne et al.

[11] 4,201,720

[45] May 6, 1980

[54] ALIPHATIC POLYCARBONATE-TRIOLS AND MODIFIED AMINOPLAST RESINS DERIVED THEREFROM

[75] Inventors: Claude G. Passagne, Champigny sur Marne; Remy R. Lippler, Bergerac; Jean-Pierre G. Senet, Melun; Jacques Plazanet, Bergerac, all of France

[73] Assignee: Societe Nationale des Poudres et Explosifs, Paris, France

[21] Appl. No.: 853,843

[22] Filed: Nov. 22, 1977

[30] Foreign Application Priority Data

Dec. 10, 1976 [FR] France .................. 76 37196

[51] Int. Cl.$^2$ .............. C07C 69/96; C08L 61/00
[52] U.S. Cl. ..................... 260/463; 525/465; 525/509; 428/412
[58] Field of Search ........................ 260/463

[56] References Cited

U.S. PATENT DOCUMENTS

| | | | |
|---|---|---|---|
| 2,787,632 | 4/1957 | Stevens | 260/463 |
| 3,535,287 | 10/1970 | Wynstra | 528/74 |
| 3,966,788 | 6/1976 | Senet et al. | 260/463 |
| 4,005,121 | 1/1977 | Senet | 260/463 |
| 4,013,702 | 3/1977 | Cartier et al. | 260/463 |

FOREIGN PATENT DOCUMENTS

| | | |
|---|---|---|
| 1152157 | 2/1958 | France . |
| 1155285 | 4/1958 | France . |
| 2037006 | 4/1969 | France . |
| 2010777 | 3/1970 | France . |
| 2294198 | 7/1976 | France . |

*Primary Examiner*—Donald G. Daus
*Assistant Examiner*—M. C. Eakin
*Attorney, Agent, or Firm*—Bucknam and Archer

[57] ABSTRACT

Aliphatic or cycloaliphatic polycarbonate-triols having a molecular weight of not more than 3,000, which contain hydrophobic segments and are liquid at room temperature are obtained by transesterifying an aryl carbonate with a primary aliphatic triol and a mixture of two diols, HOAOH and HOBOH, at least one of the radicals A or B being a hydrophobic radical, the proportion of the primary aliphatic triol is such that there is statistically one molecule of the said triol per polymer chain in the product, and the ratio of the diols being such that the polycarbonate-triol obtained is equivalent to a mixture of a% by weight of a polycarbonate derived from the triol and the diol HOAOH alone, and of b% by weight of a polycarbonate derived from the triol and the diol HOBOH alone, the percentages a and b corresponding to the following two conditions:

$$30\% \leq a\% \leq 70\%$$

$$a\% + b\% = 100\%.$$

Modified aminoplast resins can be obtained by reacting such polycarbonate-triols with etherified melamine-formaldehyde condensates.

7 Claims, No Drawings

ALIPHATIC POLYCARBONATE-TRIOLS AND MODIFIED AMINOPLAST RESINS DERIVED THEREFROM

The present invention is concerned with novel aliphatic polycarbonate-triols that can be used to obtain modified aminoplast resins.

It is known, for example, from French Pat. No. 1,152,157 and U.S. Pat. No. 2,787,632, that aliphatic polycarbonate-diols can be obtained by transesterification between an aliphatic diol or a mixture of aliphatic diols and an aliphatic or aromatic carbonate.

It is also known from French Pat. No. 1,155,285 that polycarbonates can be obtained by the transesterification of a diol/triol mixture with an aliphatic carbonate. A cross-linked polyhydroxylated polycarbonate is thus obtained which, by reaction with diisocyanates, gives polymers of high density and high strength. The production of polyhydroxylated polycarbonates by the transesterification of a diol/triol mixture with an aliphatic or aromatic carbonate is also described in French Pat. No. 2,010,777 and No. 2,037,006. These polyhydroxylated polycarbonates are generally described as being solid compounds or viscous oils.

We have now surprisingly found that aliphatic or cycloaliphatic polycarbonate-triols having a molecular weight of not more than 3000 and which are liquid at room temperature, can be obtained by a transesterification reaction between an aryl polycarbonate and a mixture of a primary aliphatic triol and two diols by suitable choice of the proportion of triol and the relative proportions of the diols.

According to the present invention, therefore, we provide a liquid aliphatic or cycloaliphatic polycarbonate-triol containing hydrophobic segments and having a molecular weight which is not more than 3,000, and which is obtained by a transesterification reaction between an aryl carbonate and a primary aliphatic triol and a mixture of two diols HOAOH and HOBOH, at least one of the radicals A and B being a hydrophobic radical, the proportion of the primary aliphatic triol used being such that there is statistically one molecule of the said triol per polymer chain in the product, and the ratio of the diols being such that the polycarbonate-triol obtained is equivalent to a mixture of a% by weight of a polycarbonate derived from the triol and the diol HOAOH alone, and of b% by weight of a polycarbonate derived from the triol and the diol HOBOH alone, the percentages a and b corresponding to the following two conditions:

$$30\% \leq a\% \leq 70\%$$

$$a\% + b\% = 100\%$$

If $$R-O-\underset{\underset{O}{\|}}{C}-O-R$$

represents the carbonate which is used for the transesterification, the corresponding reaction schemes are as follows:

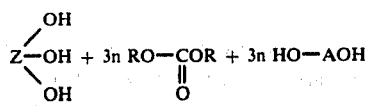

$$\longrightarrow Z\left[\left(O-\underset{\underset{O}{\|}}{C}OA\right)_n OH\right]_3 + 6n\ ROH$$

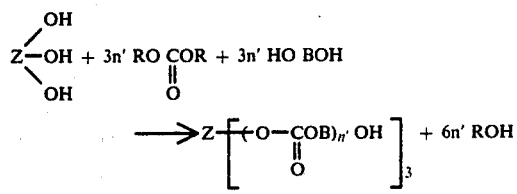

in which Z is a trivalent alkyl radical, and n and n' are numbers representing the degrees of polymerisation.

In the following discussion, Mn is the number average molecular weight of the polycarbonate obtained using the diol HOAOH alone and Mn' is the number average moledular weight of the polycarbonate obtained using the diol HOBOH alone. From the definition of a and b, in z g of the resulting polycarbonate, there are az/(100 Mn) mols of the polycarbonate derived from the diol HOAOH, and bz(100 Mn') mols of the polycarbonate derived from the diol HOBOH.

In order to obtain z g of polycarbonate, $$\frac{z}{100}\left(\frac{a}{\overline{Mn}} + \frac{b}{\overline{Mn'}}\right)\text{mols of the triol } Z\overset{OH}{\underset{OH}{-OH}},$$

$$3n\ \frac{az}{100\ \overline{Mn}}\ \text{mols of the diol HOAOH,}$$

$$3n'\ \frac{bz}{100\ \overline{Mn'}}\ \text{mols of the diol HOBOH, and}$$

$$\frac{z}{100}\left(\frac{3n\ a}{\overline{Mn}} + \frac{3n'b}{\overline{Mn'}}\right)\text{mols of the carbonate } R\underset{\underset{O}{\|}}{O\ C}OR$$

must therefore be used.

It should be noted that if the number average molecular weights Mn and Mn' are fixed, the degrees of polymerisation n and n' are fixed, and vice versa. in fact, if Md is the molecular weight of the diol HOAOH, Md' is the molecular weight of the diol HOBOH, and Mz is the molecular weight of the triol,

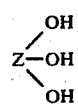

then:

$$n = \frac{\overline{Mn} - Mz}{3(26 + Md)} \text{ and } n' = \frac{\overline{Mn'} - Mz}{3(26 + Md')}$$

As has been stated above, the proportion of primary aliphatic triol is such that there is statistically one molecule of triol per polymer chain in the product. Although we do not wish to be restricted by theoretical considerations, it is thought that there is, in fact, one molecule of triol per polymer chain in the product.

Suitable primary aliphatic triols for use in accordance with the invention are triols, the hydrocarbon skeleton of which is an aliphatic chain which may, if desired, contain cycloaliphatic or aromatic rings and the hydroxyl groups of which are attached to primary aliphatic carbon atoms. The primary aliphatic triol must be heat stable and have a boiling point at atmospheric pressure which is at least 220° C. Trimethylolpropane and trimethylolethane are particularly preferred primary aliphatic triols.

The diols HOAOH and HOBOH may be aliphatic or cycloaliphatic diols which may optionally be substituted by alkyl radicals and the aliphatic chain or the aliphatic ring may optionally contain ether or thioether linkages. In the case of linear aliphatic diols, the hydrocarbon chain joining the two hydroxyl groups contains, in addition to the optional ether of thioether linkages, from 4 to 6 carbon atoms; in the case of cycloaliphatic diols, the hydrocarbon ring carrying the hydroxyl groups contains, in addition to the optional ether or thioether linkages, from 4 to 6 carbon atoms. Suitable diols are, for example, butane-1,4-diol, butane-1,3-diol, pentane-1, 5-diol, neopentyl glycol, hexane-1,6-diol, 2,2,4-trimethylhexane-1,6-diol, di-(ethylene glycol), tri-(ethylene glycol), 2,2,4,4-tetramethylcyclobutane-1, 3-diol and dimethanolcyclohexane.

The transesterifying agents which can be used according to the present invention are the conventional aryl carbonates known to those skilled in the art, particularly phenyl carbonate and naphthyl carbonate.

The transesterification reaction may be carried out in conventional manner in the presence of a basic catalyst. The mixture of diols and triols is, for example, mixed with the transesterifying agent and a basic catalyst, for example an alkali metal alcoholate or an alkali metal hydride, such as sodium methylate, sodium phenate or lithium hydride. The reaction is preferably effected by heating and stirring the mixture for a period of from 4 to 6 hours at a temperature of from 120° to 150° C., under a pressure of from 120 to 50 mm Hg. The temperature is then raised to from 150° C. to 190° C., whilst the pressure is lowered to less than 50 mm Hg over an additional period of time of about 2 hours. While the temperature is maintained at from 150° to 190° C., a nitrogen sweep is carried out for from half an hour to one hour, under a pressure of about 10 mm Hg. The catalyst should be neutralised on completion of the reaction, neutralisation being effected either immediately before, during or after the nitrogen sweep.

In all cases, the polycarbonate obtained is preferably purified either by simple stripping under reduced pressure or the purification technique with water described in French Pat. No. 2,294,198.

Because they are in the liquid state at room temperature, the polycarbonate-triols according to the invention can be readily reacted with etherified melamine-formaldehyde condensates of the formula:

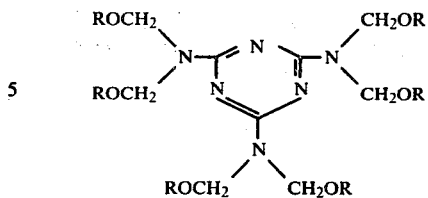

in which R is a lower alkyl radical, without fusion or dissolution, to form modified aminoplast resins. The polycarbonate-triols according to the invention exhibit very good compatability with such condensates and yield resins which have a very high resistance to hydrolysis because of the presence of hydrophobic radicals in the polycarbonate-triol. According to a preferred embodiment, the polycarbonate-triols are partially esterified, whilst hot, with about 1% by weight of citric acid or trimellitic acid before reacting with the malamine-formaldehyde condensates. The resins thus obtained have a very high gloss and can be filled with coloured pigments. They are suitable for all stoving lacquer applications and particularly for coating small household electrical equipment.

In order that the invention may be more fully understood, the following examples are given by way of illustration only:

EXAMPLE 1

This example relates to the synthesis of an aliphatic polycarbonate-triol trimethylolpropane-butane-1, 4-diol (a=50%) hexane-1,6-diol (b=50%) having a molecular weight of about 2,000.

The apparatus used consisted or:
A 4 l double-walled glass reactor equipped with an efficient stirrer, a thermometer, a manometer and a stainless steel dip tube,
a double-walled distillation column, effective length 320 mm, diameter 20 mm, packed with Raschig rings, and
a vacuum control instrument.

129.2 g (0.964 mol) of trimethylolpropane, 697.8 g (7.753 mols) of butane-1,4-diol, 737.1 g (6.246 mols) of hexane-1,6-diol and 2,996 g (14 mols) of diphenyl carbonate were introduced into the reactor. The mixture was heated at 120° C. whilst stirring, and 100 mg of sodium methylate were added. The reaction mixture was then raised to 135° C. under 48 mm Hg. The actual transesterification started at this stage, and the phenol commenced to distill off.

After 5 hours, about 90% of the theoretical amount of phenol had been collected. The pressure was then reduced to 40 mm Hg and the temperature was raised to 190° C. These conditions were maintained until the evolution of phenol had ceased.

The temperature of the reaction mixture was reduced to 175° C. and the pressure was maintained at 200 mm Hg. 100 ml of a 5% aqueous solution of acetic acid and then 300 ml of industrial grade water were introduced slowly through the dip tube. The temperature of the mixture fell to 70° C. The temperature was allowed to return to 170° C., whilst reducing the pressure from 200 to 38 mm Hg. 1,920 g of a clear oil were thus obtained, which had the following characteristics:
OH content: 1.51 equivalents/kg
free phenol content: 0.3%
Brookfield viscosity at 25° C.: 170,000 cP.

By way of comparison, an aliphatic polycarbonate-triol having a molecular weight of about 2,000 was prepared in the same apparatus and according to an identical method of operation, starting from 132.6 g (0.989 mol) of trimethylolpropane, 1,484 g (14 mols) of di-(ethylene glycol) and 2,996 g (14 mols) of diphenyl carbonate. In spite of the presence of the ether linkages in the —(CH$_2$)$_2$—O—(CH$_2$)$_2$— groups, the Brookfield viscosity at 25° C. of the product obtained was 870,000 cP, that is substantially greater than that of the preceding product.

EXAMPLE 2

This example relates to the synthesis of an aliphatic polycarbonate-triol trimethylolpropane-butane-1,4-diol (a=50%) hexane-1,6-diol (b=50%) having a molecular weight of about 1,000.

The apparatus used and the method of operation followed were those indicated in Example 1 (the only difference being that in the removal phase of the last 10% of phenol, the temperature was maintained at 178° C. and the pressure at 28 mm Hg).

The process was carried out with 198.7 g (1.483 mols) of trimethylolpropane, 498.4 g (5.538 mols) of butane-1,4-diol, 526.4 g (4.461 mols) of hexane-1,6-diol and 2,140 g (10 mols) of diphenyl carbonate.

1,462 g of a readily flowing clear oil were thus obtained, the characteristics of which were as follows:
  OH content: 2.78 equivalents/kg
  free phenol content: 0.17%
  total phenol content: 0.17%

EXAMPLE 3

This example relates to the larger scale synthesis of an aliphatic polycarbonate-triol trimethylolpropane-butane-1,4-diol (a=50%) hexane-1,6-diol (b=50%) having a molecular weight of about 1,000.

1,221 kg (9.112 mols) of trimethylolpropane, 2,708 kg (30.09 mols) of butane-1,4-diol, 11.623 kg (54.313 mols) of diphenyl carbonate and 2.859 kg (24.233 mols) of hexane-1,6-diol were introduced into a 20 liter reactor heated by a thermostat-controlled oil bath and equipped with an anchor stirrer, a packed distillation column, and a base valve. The mixture was heated at 80° C. whilst stirring, and 500 mg of sodium methylate were added. The reaction mixture was heated to 150° C. under 110 mm Hg. The actual transesterification started at this stage, and the phenol started to distill off.

4 kg of phenol were collected over 2 hours. With the temperature maintained at 150° C., the pressure was progressively reduced to 15 mm Hg over 5 hours. A total of 10.20 kg of phenol were thus collected, this being 100% of theory.

With the temperature of the reaction mixture at 165° C., the pressure was maintained at 200 mm Hg and 600 ml of a 1% aqueous solution of acetic acid were introduced through the base valve over about 5 minutes. The temperature fell to 140° C. 1.6 l of industrial grade water were then introduced over about 5 minutes. With the temperature maintained at 150° C. and the pressure at 60 mm Hg, a stream of dry nitrogen was passed for 20 minutes. 7.55 kg of a readily flowable clear oil were thus obtained, the characteristics of which were as follows:
  OH content: 2.92 equivalents/kg
  free phenol content: 0.05%
  total phenol content: 0.16%
  water content: 0.025%
  viscosity in centerpoises: 59,000 at 25° C. and 8,300 at 50° C.

EXAMPLE 4

This example relates to the synthesis of an aliphatic polycarbonate-triol trimethylolpropane-butane-1,4-diol (a=70%) hexane-1,6-diol (b=30%) having a molecular weight of about 1,000.

The apparatus used and the method of operation followed were those indicated in Example 3 with the following differences: the temperature reached at the end of the reaction was 180° C., the catalyst was neutralised by the addition of azelayl chloride, and the treatment with water was replaced by simple degassing for 15 minutes at 180° C. under 60 mm Hg.

The process was carried out with 1.34 kg of trimethylolpropane, 4.16 kg of butane-1,4-diol, 1.88 kg of hexane-1,6-diol, 13.306 kg of diphenyl carbonate and 150 mg of lithium hydride. 8.550 kg of a clear oil were thus obtained, which had the following characteristics:
  OH content: 3.07 equivalents/kg
  free phenol content: 0.46%
  total phenol content: 0.46%
  water content: 0.022%
  viscosity in centipoises: 46,500 at 25° C. and 6,600 at 50° C.

EXAMPLE 5

This example relates to the synthesis of an aliphatic polycarbonate-triol trimethylolpropane-butane-1, 4-diol (a=30%) hexane-1,6-diol (b=70%) having a molecular weight of about 1,000.

The apparatus used and the method of operation followed were those indicated in Example 3 with the following differences: the temperature reached at the end of the reaction was 180° C., the catalyst was neutralised by the addition of azelayl chloride, and the treatment with water was carried out over 23 minutes by the addition of 1.8 l of industrial grade water.

The process was carried out with 1.34 kg of trimethylolpropane, 1.783 kg of butane-1,4-diol, 4.395 kg of hexane-1,6-diol, 12.207 kg of diphenyl carbonate and 1 g of sodium methylate. 8.700 kg of a clear oil were thus obtained, which had the following characteristics:
  OH content: 3.23 equivalents/kg
  free phenol content: 0.56%
  total phenol content: 0.71%
  water content: 0.046%
  viscosity in centipoises: 15,100 at 25° C. and 2,500 at 50° C.

EXAMPLE 6

This example describes the preparation of a white stoving lacquer using the aliphatic polycarbonate-triol product described in Example 2.

The above-mentioned polycarbonate was partially esterified with trimellitic acid according to the following formulation:
polycarbonate: 1,000 parts by weight
trimellitic acid: 83 parts by weight.

The trimellitic acid was introduced into the liquid polycarbonate whilst stirring at room temperature. The mixture was esterified at 200° C. for about 4 hours.

The polycarbonate esterified in this way was used in the following formulation:
RNCX titanium dioxide from Kronos: 20 parts by weight,
esterified polycarbonate: 30.5 parts by weight, methylated melamine-formaldehyde condensate in the form of a 68% solids content suspension in a 1/1 mixture of isobutanol and isopropanol (Luwipal LR 8334 from BASF): 29.7 parts by weight, methyl ethyl ketone: 19.8 parts by weight.

The titanium oxide was dispersed in the polycarbonate with 10 parts of methyl ethyl ketone using a bead mill, until a fineness of 9 on the North gage was obtained. The formulation was then completed with the condensate and 9.8 parts of methyl ethyl ketone. The mixture thus obtained was diluted with 15% of methyl ethyl ketone in order to obtain a viscosity of 25 seconds in an AFNOR No. 4 cup.

Application of this lacquer was carried out with a spray gun on bare sheet metal which had been degreased with trichloroethylene in the cold. After a preliminary drying time of 10 minutes at room temperature, the coated sheet was placed in a convection oven for 20 minutes at a temperature of 130° C. A white lacquer was thus obtained, the Persoz hardness of which was 220 seconds for a thickness of 40 μ, and the gloss of which was 55% as measured on a Gardner glossmeter at an incidence of 45°.

(Persoz hardness is the damping time of a pendulum to swing from an amplitude of 12° to 4° according to AFNOR Standard Specification T 30/016 of May 1965, and Gardner gloss is the percentage of reflected light at an incidence of 45° according to ASTM Standard Specification D 523-62 T).

EXAMPLE 7

This example relates to the preparation of a white stoving lacquer from the aliphatic polycarbonate-triol product described in Example 1.

The procedure followed was as described in Example 6, except that esterification of the polycarbonate was not carried out. Under these conditions, a white lacquer was obtained, having the following characteristics, as measured under the conditions of Example 6:

Persoz hardness: 120 seconds

Gardner gloss: 39%.

What is claimed is:

1. A liquid aliphatic or cycloaliphatic polycarbonate-triol containing hydrophobic segments and having a molecular weight which is not more than 3,000, and which is obtained by a transesterification reaction between an aryl carbonate and a primary aliphatic triol and a mixture of two diols HOAOH and HOBOH, A and B being different, at least one of the radicals A and B being a hydrophobic radical, said diols being aliphatic or cycloaliphatic, said triol having a boiling point of at least 220° C., the proportion of said primary aliphatic triol used being such that there is statistically one molecule of the said triol per polymer chain the product, and the ratio of said diols being such that the polycarbonate-triol obtained is equivalent to a mixture of a% by weight of a polycarbonate derived from the triol and the diol HOAOH alone, and of b% by weight of a polycarbonate derived from the triol and the diol HOBOH alone, the percentages a and b corresponding to the following two conditions:

$$30\% \leqq a\% \leqq 70\%$$

$$a\% + b\% = 100\%.$$

2. A polycarbonate-triol according to claim 1, wherein said primary aliphatic triol is selected from the group consisting of trimethylolpropane and trimethylolethane.

3. A polycarbonate-triol according to claim 1, wherein said diols are selected from the group consisting of butane-1,4-diol, butane-1,3-diol, pentane-1,5-diol, neopentyl glycol, hexane-1,6-diol, 2,2,4-trimethylhexane-1,6-diol, di-(ethylene glycol), tri-(ethylene glycol), 2,2,4,4-tetramethylcyclobutane-1,3-diol and dimethanolcyclohexane.

4. A polycarbonate-triol according to claim 1, wherein said primary aliphatic triol is trimethylolpropane and said diols are butane-1,4-diol and hexane-1,6-diol.

5. The polycarbonate-triol according to claim 1 wherein the aliphatic chain or cycloaliphatic ring of one of said diols of formula HOAOH and HOBOH is substituted by an ether or a thioether linkage.

6. The polycarbonate-triol according to claim 4 where a and b are each 50%.

7. The polycarbonate-triol according to claim 1 wherein the hydrocarbon skeleton of said primary aliphatic triol is an aliphatic chain which contains a cycloaliphatic or an aromatic ring and the hydroxy groups are attached to primary aliphatic carbon atoms.

* * * * *